United States Patent
Kovach et al.

(10) Patent No.: US 7,569,943 B2
(45) Date of Patent: Aug. 4, 2009

(54) VARIABLE SPEED WIND TURBINE DRIVE AND CONTROL SYSTEM

(75) Inventors: Joesph A. Kovach, Aurora, OH (US); Norman C. Lindner, Lake Wylie, SC (US); Bradley E. Nicol, Plain City, OH (US); Richard D. Kimpel, Middleburg Hts., OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 79 days.

(21) Appl. No.: 11/943,874

(22) Filed: Nov. 21, 2007

(65) Prior Publication Data

US 2008/0296897 A1 Dec. 4, 2008

Related U.S. Application Data

(60) Provisional application No. 60/860,773, filed on Nov. 21, 2006.

(51) Int. Cl.
*F03D 17/02* (2006.01)
(52) U.S. Cl. .................................. 290/44; 290/55
(58) Field of Classification Search ............ 290/44, 290/55
See application file for complete search history.

(56) References Cited

U.S. PATENT DOCUMENTS

| | | | | |
|---|---|---|---|---|
| 2,539,862 A | * | 1/1951 | Rushing | 62/230 |
| 3,269,121 A | * | 8/1966 | Bening | 60/398 |
| 3,952,723 A | * | 4/1976 | Browning | 126/247 |
| 4,055,950 A | * | 11/1977 | Grossman | 60/398 |
| 4,149,092 A | * | 4/1979 | Cros | 290/54 |
| 4,274,010 A | * | 6/1981 | Lawson-Tancred | 290/55 |
| 4,309,152 A | * | 1/1982 | Hagen | 417/218 |
| 4,317,048 A | * | 2/1982 | Kime | 290/53 |
| 4,496,847 A | * | 1/1985 | Parkins | 290/44 |
| 4,503,673 A | | 3/1985 | Schachle et al. | |
| 4,625,125 A | | 11/1986 | Kuwabara | |
| 4,753,078 A | | 6/1988 | Gardner, Jr. | |
| 5,083,039 A | | 1/1992 | Richardson et al. | |
| 5,225,712 A | | 7/1993 | Erdman | |
| 5,495,128 A | * | 2/1996 | Brammeier | 290/55 |
| 5,652,485 A | | 7/1997 | Spiegel et al. | |
| 5,907,192 A | | 5/1999 | Lyons et al. | |
| 6,566,764 B2 | | 5/2003 | Rebsdorf et al. | |
| 6,670,721 B2 | | 12/2003 | Lof et al. | |
| 6,748,737 B2 | | 6/2004 | Lafferty | |
| 6,856,038 B2 | | 2/2005 | Rebsdorf et al. | |
| 6,856,040 B2 | | 2/2005 | Feddersen et al. | |
| 6,858,953 B2 | | 2/2005 | Stahlkopf | |
| 6,879,053 B1 | | 4/2005 | Welches et al. | |
| 6,900,998 B2 | | 5/2005 | Erickson et al. | |
| 6,911,743 B2 | | 6/2005 | Ishizaki | |

(Continued)

FOREIGN PATENT DOCUMENTS

FR 2755473 A1 * 5/1998

(Continued)

*Primary Examiner*—Joseph Waks
(74) *Attorney, Agent, or Firm*—Daniel J. Whitman

(57) ABSTRACT

A variable speed wind turbine utilizes a hydraulic transmission including a hydraulic pump coupled to a rotor and a hydraulic motor coupled to an induction generator to produce variable frequency power that is converted to grid frequency power by electronic controls.

18 Claims, 2 Drawing Sheets

U.S. PATENT DOCUMENTS

| | | |
|---|---|---|
| 6,933,625 B2 | 8/2005 | Feddersen et al. |
| 6,974,307 B2 | 12/2005 | Antoune et al. |
| 6,998,728 B2 | 2/2006 | Gupta et al. |
| 7,015,595 B2 | 3/2006 | Feddersen et al. |
| 7,040,859 B2 | 5/2006 | Kane |
| 7,042,110 B2 | 5/2006 | Mikhail et al. |
| 7,095,131 B2 | 8/2006 | Mikhail et al. |
| 7,145,262 B2 | 12/2006 | Kikuchi et al. |
| 7,183,664 B2 * | 2/2007 | McClintic .................... 290/55 |
| 7,203,078 B2 | 4/2007 | Datta et al. |
| 7,239,036 B2 | 7/2007 | D'Atre et al. |
| 7,418,820 B2 * | 9/2008 | Harvey et al. ................. 60/487 |
| 7,485,979 B1 * | 2/2009 | Staalesen .................... 290/44 |
| 2005/0155346 A1 * | 7/2005 | Nikolaus .................... 60/398 |
| 2006/0210406 A1 * | 9/2006 | Harvey et al. ............... 417/334 |
| 2007/0121354 A1 | 5/2007 | Jones et al. |

FOREIGN PATENT DOCUMENTS

| | | | |
|---|---|---|---|
| JP | 61212674 A | | 9/1986 |
| JP | 2006132323 A | * | 5/2006 |
| WO | WO 2004/079186 A2 | | 9/2004 |

\* cited by examiner

US 7,569,943 B2

VARIABLE SPEED WIND TURBINE DRIVE AND CONTROL SYSTEM

CROSS-REFERENCE TO RELATED CASES

The present application claims the benefit of U.S. Provisional Patent Application Ser. No. 60/860,773, filed Nov. 21, 2006, the disclosure of which is incorporated herein by reference.

FIELD OF THE INVENTION

The present invention relates to a wind driven electric power production system, and more particularly to a variable speed wind turbine drive and control system which utilizes a hydraulic pump coupled to the rotor to drive a hydraulic motor coupled to an induction generator producing AC power and utilizing electronic controls to produce a grid frequency power generation at variable rotor speeds.

BACKGROUND

The majority of wind turbines utilize a mechanical speed increasing gearbox which is prone to failure resulting in extended down time and high maintenance costs. It is possible to remove the gearbox from the wind turbine system by utilizing a hydrostatic transmission. These prior art wind turbines have generally been limited to fixed speed generators in order to enable the system to be attached to a power grid. This has been accomplished using blade control systems to compensate for changes in wind speed, pressure control systems to control changes in hydraulic flow, as well as variable displacement motors and pumps to compensate for pressure changes in the hydrostatic systems.

The use of power electronics to convert a variable frequency output of a variable speed AC generator into useable AC power is well known. U.S. Pat. No. 5,083,039 deals with this type of control used on variable speed wind turbines.

It would therefore be an advantage to provide a variable speed wind turbine that utilizes a hydrostatic transmission that does not require the use of a gearbox.

SUMMARY

At least one embodiment of the invention provides a variable speed wind turbine transmission system comprising: a turbine rotor driven by wind; a fixed displacement hydraulic pump coupled to the rotor; a fixed displacement hydraulic motor coupled to a generator; a hydraulic circuit to transfer fluid from the pump to the motor; wherein the generator rotates at a variable speed directly related to rotation of the turbine rotor and produces an electrical output at a variable frequency; and a power converter to convert the variable frequency electrical output of the generator into grid frequency power.

At least one embodiment of the invention provides a variable speed wind turbine system comprising: a turbine rotor driven by the wind; a fixed displacement hydraulic pump directly driven by the rotor; a fixed displacement hydraulic motor; a closed loop hydraulic fluid circuit for carrying pressurized oil to the hydraulic motor from the hydraulic pump and to return hydraulic fluid to the hydraulic pump from the hydraulic motor; an induction generator directly driven by the fixed displacement hydraulic motor, the induction generator producing AC power at variable frequency; a power converter including an inverter which converts the AC power to DC power, an active front end which converts the DC power into grid frequency AC power, and an L-C-L filter which reduces power line harmonics.

At least one embodiment of the invention provides a method for producing a grid frequency power with a variable speed wind turbine, the method comprising the steps of: providing a variable speed wind turbine comprising a turbine rotor driven by wind, a fixed displacement hydraulic pump coupled to the rotor, a fixed displacement hydraulic motor coupled to a generator, and a hydraulic circuit to transfer fluid from the pump to the motor; subjecting the rotor of the variable speed wind turbine to a source of wind such that the generator produces an electrical output at a variable frequency related to a speed of rotation of the rotor; and converting the variable frequency electrical output of the generator into grid frequency power.

BRIEF DESCRIPTION OF THE DRAWINGS

Embodiments of this invention will now be described in further detail with reference to the accompanying drawing, in which.

DETAILED DESCRIPTION

Figure 1:
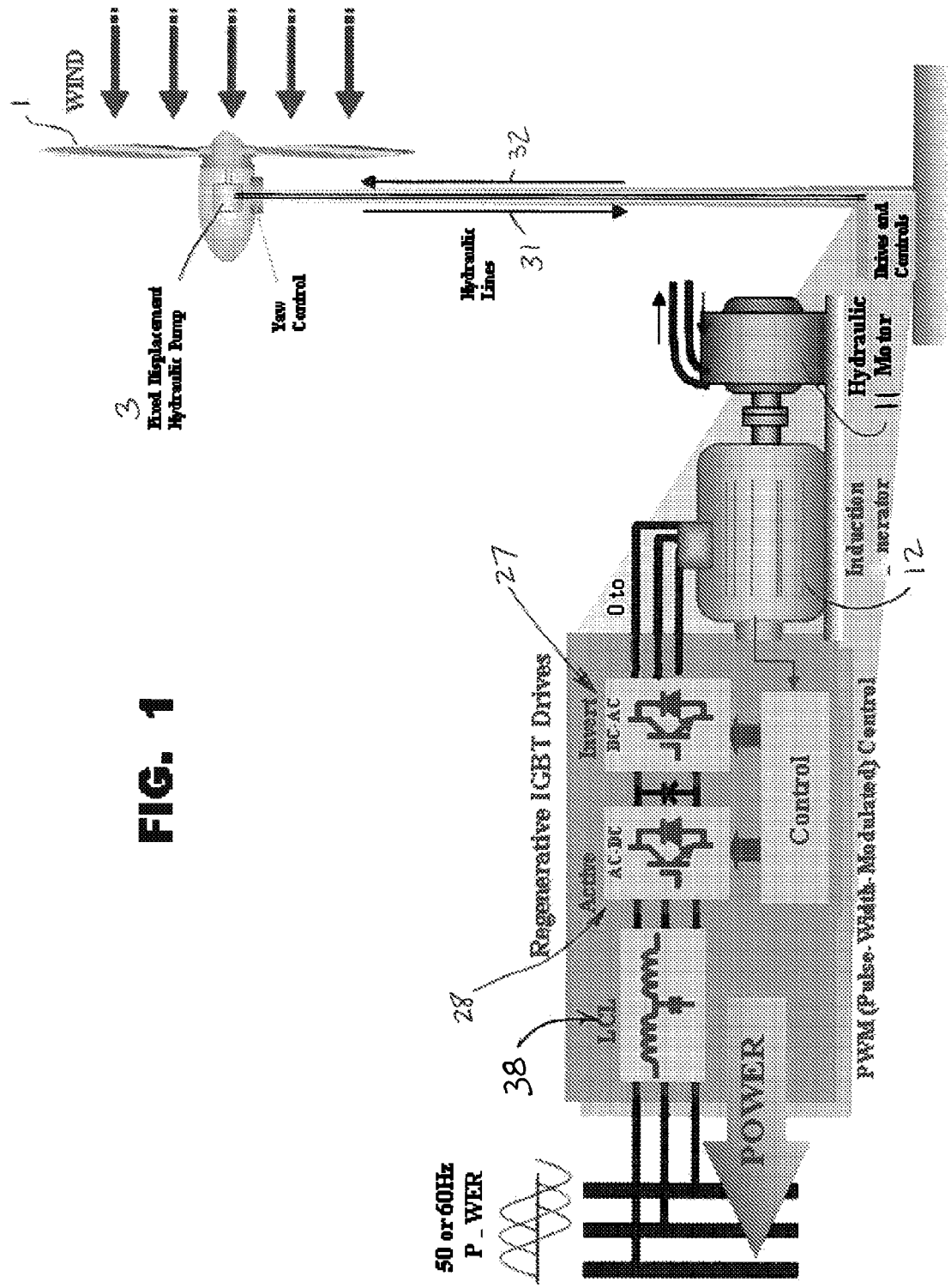
FIG. 1 is a conceptual schematic view of an embodiment of a wind energy system in accordance with the present invention.

The proposed system 110 is designed as a means of converting kinetic energy from the wind into electrical power suitable to be transferred over the electrical grid. Referring now to FIG. 1, a rotor 1 is shown mounted on a nacelle of a wind tower. A hydraulic pump 3 positioned in the nacelle is coupled to the rotor 1. In one embodiment of the invention, the pump 3 is directly driven by the shaft of the rotor 1 and the pump 3 rotates at the same speed as the rotor 1. A first hydraulic fluid line 31 connects the hydraulic pump output to a hydraulic motor 11 which may be positioned on the ground or in the nacelle. A second hydraulic fluid line 32 connects the hydraulic motor 11 to the fluid input of the hydraulic pump 3 in the nacelle to complete the fluid circuit. The flow going through the motor 11 turns the motor output shaft, which is directly coupled to an electric generator 12. The generator 12, coupled to the rotation of the rotor 1 through the hydraulic transmission, produces variable frequency AC power. A generator drive inverter 27 converts the variable frequency AC power to DC power which is transferred into the Active Front End (AFE) 28. The AFE 28 is synchronized with the frequency of the grid, so it can convert the DC power into grid frequency AC power. The AFE 28 synthesizes the sinusoidal input voltage by Pulse-Width-Modulation (PWM). A tuned L-C-L filter 38 reduces potential PWM power line harmonics to negligible levels.

Figure 2:
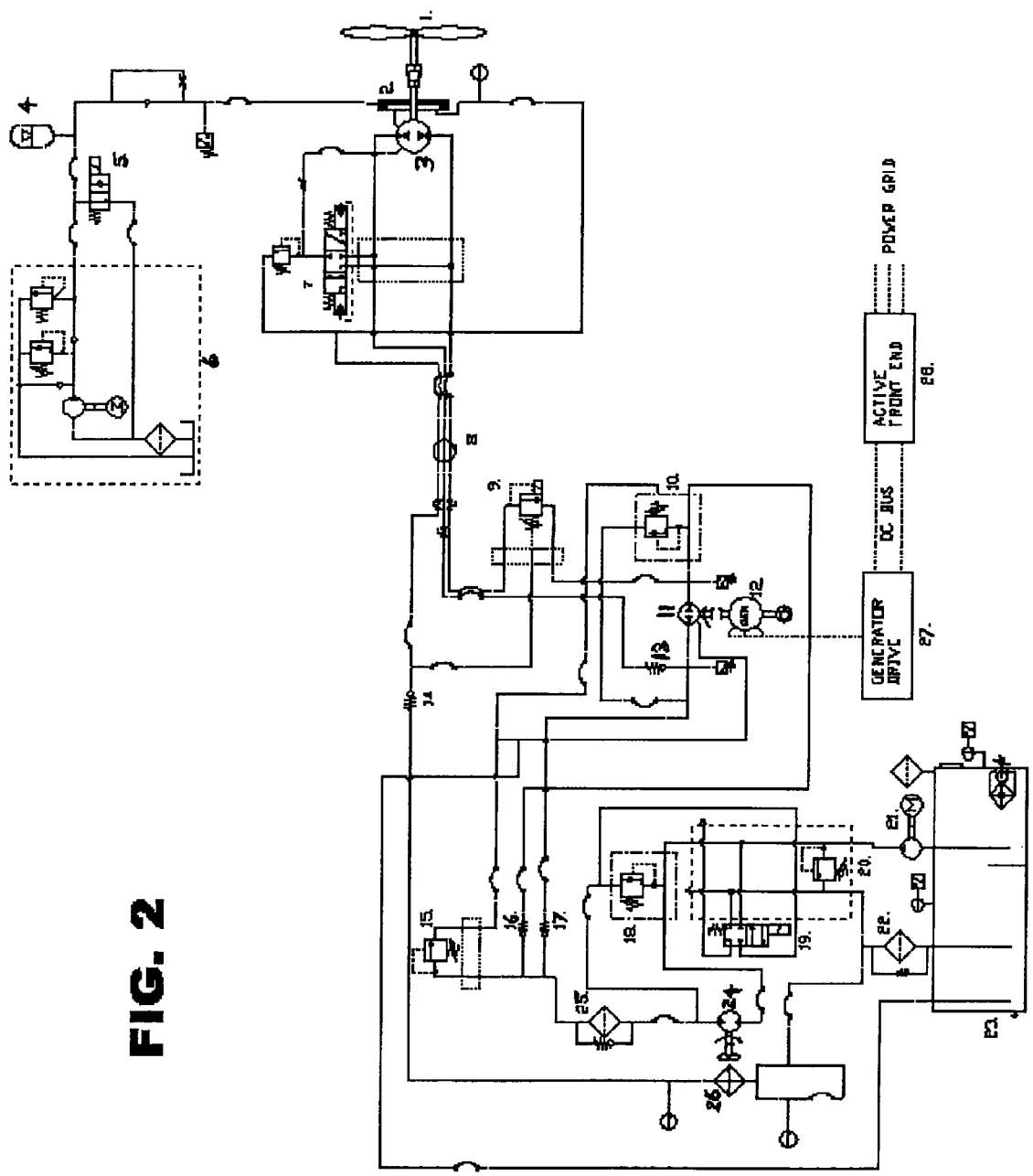
FIG. 2 is a hydraulic schematic view an embodiment of the present invention also showing various possible optional features.

The hydraulic circuit for this system 110 is shown in FIG. 2 and the system is discussed in additional detail. The rotor 1 is placed in an air stream to turn a shaft. The shaft is shown directly coupled to the drive shaft of a hydraulic pump 3. A high pressure hydraulic line 31 connects the outlet of the pump to the inlet of the motor 11, and a low pressure return line 33 connects the outlet of the motor 11 to the inlet of the pump 3. Flow is generated through this hydraulic loop as the pump shaft is driven by the rotor 1. The flow going through the motor 11 turns the motor output shaft, which is directly coupled to an electric generator 12. The pump 3 has a much larger displacement than the motor 11, so the hydraulic transmission acts as a speed increaser. This allows the use of a relatively small generator 12 even though the rotor input speed is slow.

As the generator 12 turns, it produces electric power which is fed into the power electronics for frequency correction before it is sent to the power grid. In addition to frequency correction, the power electronics control the loading of the system proportional to rotor speed. This allows the rotor 1 to operate at its most efficient speed relative to wind velocity and therefore optimize the amount of power captured from the wind.

The induction generator rotor speed is precisely measured by means of a quadrature encoder or resolver feedback. This feedback is provided to the generator inverter control, which regulates the amount of negative slip (rpm difference from true synchronous speed) of the induction generator by means of Flux Vector (FV) control. The Flux Vector algorithm optimally controls frequency and excitation to the generator at all speed and load conditions. This is accomplished by optimizing the Magnetization Current Vector (motor "field") component, relative to the Torque Current Vector component.

Alternatively, the generator inverter control can be operated without the need for a rotor speed feedback device. This mode of operation is known as Sensorless Vector (SV) control. In the SV mode, the control algorithm approximates rotor rpm, based on applied frequency, current, and voltage, and the known slip and torque characteristics of the induction generator. Upon initial commissioning, a self-tuning algorithm locks itself into the unique generator characteristics by interpolating the results by stimulating electrical impulses to the generator.

The generator inverter control provides additional ability to operate the wind turbine generator above its designated base speed and frequency ratings, at a constant torque level, thereby widening the power capture bandwidth. This additional power capture bandwidth is effective up to the mechanically safe operating limits of any component of the turbine, with the capability to adjust the speed safe-limit point.

The power electronics used on this system are capable of controlling both speed and torque of the generator shaft. Increasing the torque required to drive the generator will increase the pressure in the hydraulic system, which in turn will increase the amount of torque required to drive the pump. A plc can be used to command the generator torque to match the maximum power output available for a given rotor speed, so that the turbine is operating at its most efficient point over a wide range of wind speeds.

The power electronics consist of two major components. The active front end 28 is connected to the grid, and the generator drive inverter 27 is connected to the output leads of the generator. During normal operation, the generator drive inverter receives variable frequency AC power from the generator and converts it to DC power which is transferred into the Active Front End (AFE). The AFE is synchronized with the frequency of the grid, so it can convert the DC power into grid frequency AC power. The AFE synthesizes the sinusoidal input voltage by Pulse-Width-Modulation (PWM). Power generated into the grid is performed at near-unity Power Factor (PF). A tuned L-C-L filter reduces potential PWM power line harmonics to negligible levels as discussed above with regard to FIG. 1.

While the turbine is generating power, the electrical grid is used to load the generator 12. In the event of a power grid failure, this load is no longer available, but it would be advantageous to perform a controlled shutdown of the turbine to limit mechanical wear on the system. Once the power grid is down, the AFE 28 is disabled so that the system is no longer feeding power onto the grid, eliminating the possibility of islanding or asynchronous faults, should the grid be re-initiated. In this instance the rotor 1 would still be turning to drive the pump 3, and generator 12 would still be feeding electrical power into the generator inverter 27. The generator inverter 27 and controls are kept operational via a Switched-Mode-Power-Supply (SMPS) fed from the DC bus. This system will use this power to keep the plc and other control components operational while a controlled shutdown is automatically performed. Excess power delivered from the turbine will be sent from the DC bus across a load resistor and turned into heat, and can also be used to power yaw motor controls to position the turbine wind-neutral until such time as the grid is reinstated.

Referring again to FIG. 2, an optional brake 2 may be installed on the rotor shaft to prevent rotation. The brake 2 can be either spring set and hydraulically released, or it can be spring released and hydraulically set. Hydraulic pressure for the brake 2 can be supplied by a brake release power unit 6 located near the brake 2.

A hot oil shuttle valve 7 may be installed on the system 110 to remove some of the hydraulic fluid from the main loop during operation so that it can be replaced with cooler fluid from the reservoir 23. A charge pump 21 transfers fluid through a replenishing filter 25 and replenishing check valves 16, 17 into the low pressure side of the loop to replace any fluid that is removed by the hot oil shuttle valve 7 and maintain positive pressure at the inlet to the pump 3. The charge pressure feeding into the replenishing check valves 16, 17 is limited by a relief valve 15. The charge pump flow may also be used to drive a hydraulic motor 24 connected to a cooling fan which blows air across a heat exchanger 26 to remove excess heat from the system. The cooling fan motor speed can be limited using a relief valve 20, or the motor 24 can be completely bypassed using a directional valve 19 when no cooling is required.

The pump 3 is located in the nacelle, which is free to rotate to face into the wind. The motor 11 and generator 12 can be located either in the nacelle or at some other location down the tower. In installations where the motor 11 and generator 12 are located apart from the pump 3, a rotary union 8 can be installed to allow the pump 3 to rotate relative to the motor 11 without twisting the hydraulic lines 31, 32.

The mechanical speed increasing gearboxes commonly used on existing turbines are a frequent point of failure in these machines. Replacing this failure prone component with a hydrostatic transmission should provide longer service life and reduced maintenance cost. The hydrostatic transmission can be built from components that are smaller, lighter, and easier to handle than the mechanical gearboxes. Since the hydrostatic transmission uses fluid as the medium to transfer power, it also has some built in shock absorbing capabilities that should reduce the wear on the rest of the turbine as it responds to sudden wind gusts and turbulent wind conditions.

The controls package used on this system allows for grid frequency power generation at a variety of rotor speeds. This enables the rotor to capture more energy from the wind than many of the fixed speed systems currently in use. Along with the speed increasing hydrostatic transmission, the controls system also allows the use of a standard, low-cost 4 or 6 pole induction generator. This is more cost-effective than some of the low speed generators that are currently used, and makes it possible to stock a replacement or obtain one quickly in the event of a failure.

The generator inverter control provides additional ability to operate the wind turbine generator above its designated base speed and frequency ratings, at a constant torque level, thereby widening the power capture bandwidth. For example, a 6-pole 60 Hz induction generator is typically limited to 1200 rpm (+slip rpm) when only grid-connected. By allowing the generator to continue to 70 Hz, or 1400 rpm (+slip), more power can be captured. This additional power capture bandwidth is effective up to the mechanically safe operating limits of any component of the turbine, with the capability to adjust the speed safe-limit point.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

What is claimed is:

1. A variable speed wind turbine transmission system comprising:
    a turbine rotor driven by wind;
    a fixed displacement hydraulic pump coupled to the rotor;
    a fixed displacement hydraulic motor coupled to a generator;
    a hydraulic circuit to transfer fluid from the pump to the motor;
    wherein the generator rotates at a variable speed directly related to rotation of the turbine rotor and produces an electrical output at a variable frequency; and
    a power converter to convert the variable frequency electrical output of the generator into grid frequency power.

2. The system of claim 1, wherein the power converter comprises:
    an inverter which converts AC power to DC power,
    an active front end which converts the DC power into grid frequency AC power; and
    an L-C-L filter which reduces power line harmonics.

3. The system of claim 2, wherein the active front end synthesizes a sinusoidal input voltage from the inverter by Pulse-Width-Modulation (PWM).

4. The system of claim 3, wherein the power converter is capable of controlling a load on the generator based on the speed of rotation of the rotor.

5. The system of claim 3, wherein the power converter controls the inverter by a generator rotor speed feedback device to regulate the amount of negative slip of the induction generator.

6. The system of claim 3, wherein the power converter controls the inverter using a sensorless vector control.

7. The system of claim 3, wherein the power converter is capable of controlling both speed and torque of the generator shaft.

8. The system of claim 3 which utilizes the energy from the spinning rotor to maintain control during a failure of the power grid.

9. The system of claim 1, wherein the system does not utilize a gearbox.

10. A variable speed wind turbine system comprising:
    a turbine rotor driven by the wind;
    a fixed displacement hydraulic pump directly driven by the rotor;
    a fixed displacement hydraulic motor;
    a closed loop hydraulic fluid circuit for carrying pressurized oil to the hydraulic motor from the hydraulic pump and to return hydraulic fluid to the hydraulic pump from the hydraulic motor;
    an induction generator directly driven by the fixed displacement hydraulic motor, the induction generator producing AC power at variable frequency;
    a power converter including an inverter which converts the AC power to DC power, an active front end which converts the DC power into grid frequency AC power, and an L-C-L filter which reduces power line harmonics.

11. The system of claim 10, wherein the active front end synthesizes a sinusoidal input voltage from the inverter by Pulse-Width-Modulation (PWM).

12. The system of claim 11, wherein the power converter is capable of controlling a load on the generator based on the speed of rotation of the rotor.

13. The system of claim 11, wherein the power converter controls the inverter by a generator rotor speed feedback device to regulate the amount of negative slip of the induction generator.

14. The system of claim 11, wherein the power converter controls the inverter using a sensorless vector control.

15. The system of claim 11, wherein the power converter is capable of controlling both speed and torque of the generator shaft.

16. A method for producing a grid frequency power with a variable speed wind turbine, the method comprising the steps of:
    providing a variable speed wind turbine comprising a turbine rotor driven by wind, a fixed displacement hydraulic pump coupled to the rotor, a fixed displacement hydraulic motor coupled to a generator, and a hydraulic circuit to transfer fluid from the pump to the motor;
    subjecting the rotor of the variable speed wind turbine to a source of wind such that the generator produces an electrical output at a variable frequency related to a speed of rotation of the rotor; and
    converting the variable frequency electrical output of the generator into grid frequency power.

17. The method of claim 16, wherein the step of converting the variable frequency electrical output of the generator into a fixed grid frequency power comprises the steps of:
    inverting the variable frequency electrical output to direct current power;
    converting the direct current power into a fixed grid frequency AC power output.

18. The method of claim 17, wherein the step of converting the variable frequency electrical output of the generator into a fixed grid frequency power further comprises the step of:
    filtering the fixed frequency grid power using an L-C-L filter.

* * * * *